Figure 1:
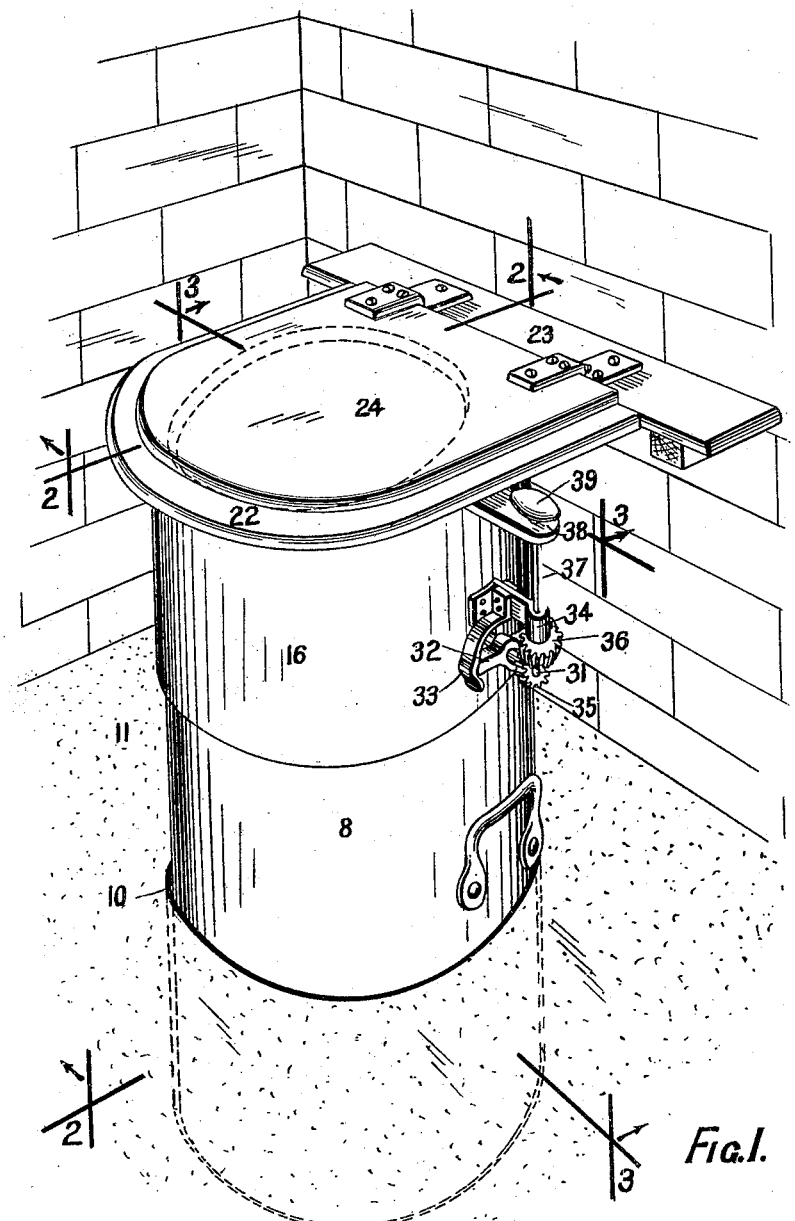

R. J. FARMER.
CLOSET OR PRIVY.
APPLICATION FILED AUG. 5, 1908.

917,274.

Patented Apr. 6, 1909.
4 SHEETS—SHEET 1.

R. J. FARMER.
CLOSET OR PRIVY.
APPLICATION FILED AUG. 5, 1908.

917,274.

Patented Apr. 6, 1909.
4 SHEETS—SHEET 2.

Witnesses

Inventor
Roland. J. Farmer
per
Attorney

R. J. FARMER.
CLOSET OR PRIVY.
APPLICATION FILED AUG. 5, 1908.
917,274.
Patented Apr. 6, 1909.
4 SHEETS—SHEET 4.
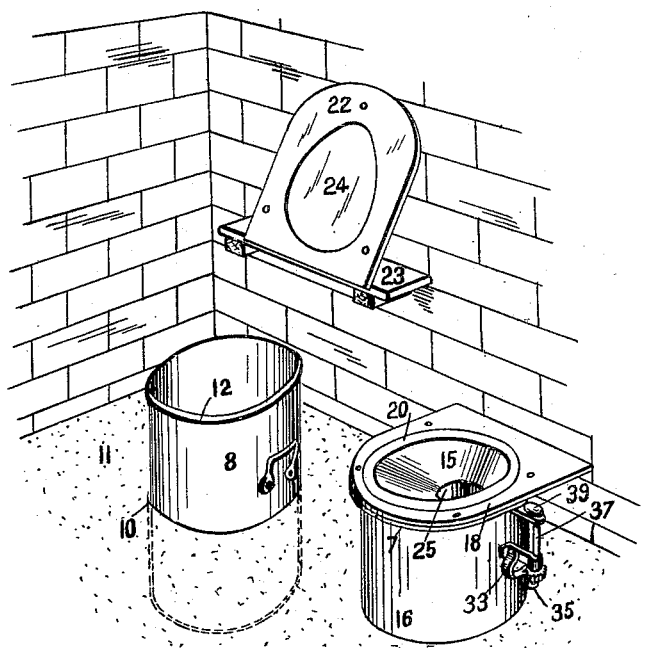
Fig. 4.
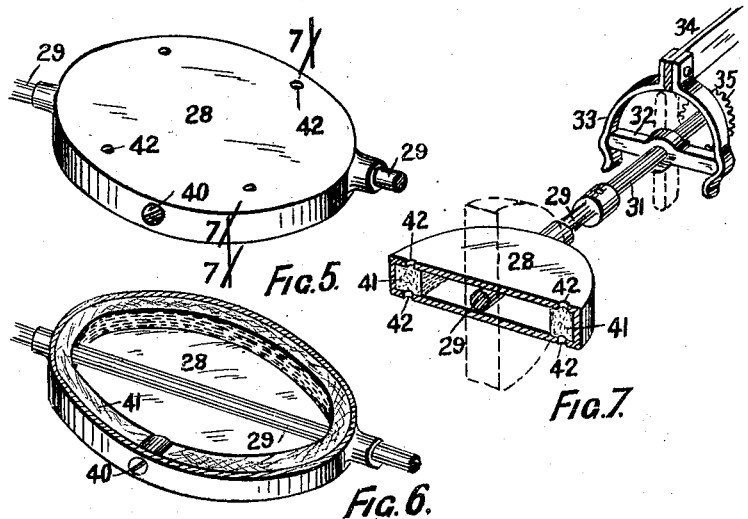
Fig. 5.
Fig. 7.
Fig. 6.
Witnesses
Inventor
Roland J. Farmer,
per Fred Walsh
Attorney
THE NORRIS PETERS CO., WASHINGTON, D. C.

UNITED STATES PATENT OFFICE.

ROLAND JOHN FARMER, OF RANDWICK, NEAR SYDNEY, NEW SOUTH WALES, AUSTRALIA.

CLOSET OR PRIVY.

No. 917,274.  Specification of Letters Patent.  Patented April 6, 1909.

Application filed August 5, 1908. Serial No. 447,083.

*To all whom it may concern:*

Be it known that I, ROLAND JOHN FARMER, a subject of the King of Great Britain, residing at "Carisbrooke," Belmore Road, Randwick, near Sydney, in the State of New South Wales and Commonwealth of Australia, have invented new and useful Improvements in Closets or Privies, of which the following is a specification.

This invention refers to closets or privies and relates to a peculiarly constructed receiving chamber or bottomless bowl hereinafter termed the bowl set above a lower receptacle or container hereinafter termed the pan and this bowl being normally closed effectively and thoroughly from the pan to prevent the emission of odors from the latter and the ingress of insect life therein. This bowl has a valvular bottom consisting of a receiving platter adapted to be manually operated to drop the deposit thereon into the pan and it is removable from said pan for the removal and emptying thereof. Further this bowl is provided with a reservoir or reservoirs for disinfecting fluid and means for allowing exudation of same and with containers of lubricant and means for the gradual supply of same to the surface of the bowl and platter though the disinfectant and the lubricant may be the one fluid. The bowl sits tightly and preferably air-tightly upon the rim of the pan which when considerable capacity is required extends below the normal level of the floor of the closet or privy.

In carrying this invention into practical operation the receiving chamber or bowl rests upon an outer casing supporting the seat or it has simply an ordinary seat-resting thereon and it is preferably made of glazed material say porcelain or earthenware and has a base forming a cover to the lower container or pan. Internally it takes in the flared mouth of a cylindrical passage or valve chamber. Externally of this bottom flared mouth is a container for the storage of a fluid lubricant having small ducts through which said lubricant may percolate on to the inside surface of said flared mouth and on to the platter or valve surface below. The cylindrical passage or valve chamber is adapted to be normally closed by a smooth platter or valve which is operatable to open and close by manual power. A preferred construction of such platter or valve is a disk closely fitting the cylindrical passage or abutting on the end of the bowl. This disk is on a horizontal spindle in bearings on brackets from the base of the bowl or when this is in two parts from the base of the cylindrical passage and this spindle has one end protruding through and carrying gearing to an operating handle about level with the seat. The platter is preferably hollow and has a cap or plug through which a lubricant or disinfectant fluid can be supplied. Near its periphery this platter has an annular channel containing absorbent material and communicating with the hollow interior and through this channel to the faces are ducts to allow the lubricant to percolate or ooze therethrough and spread itself by capillary action on said faces. But in order to illustrate how this invention may be advantageously carried out in practice the same will now be described in detail with reference to the drawings accompanying and forming part of this complete specification in which—

Figure 2:
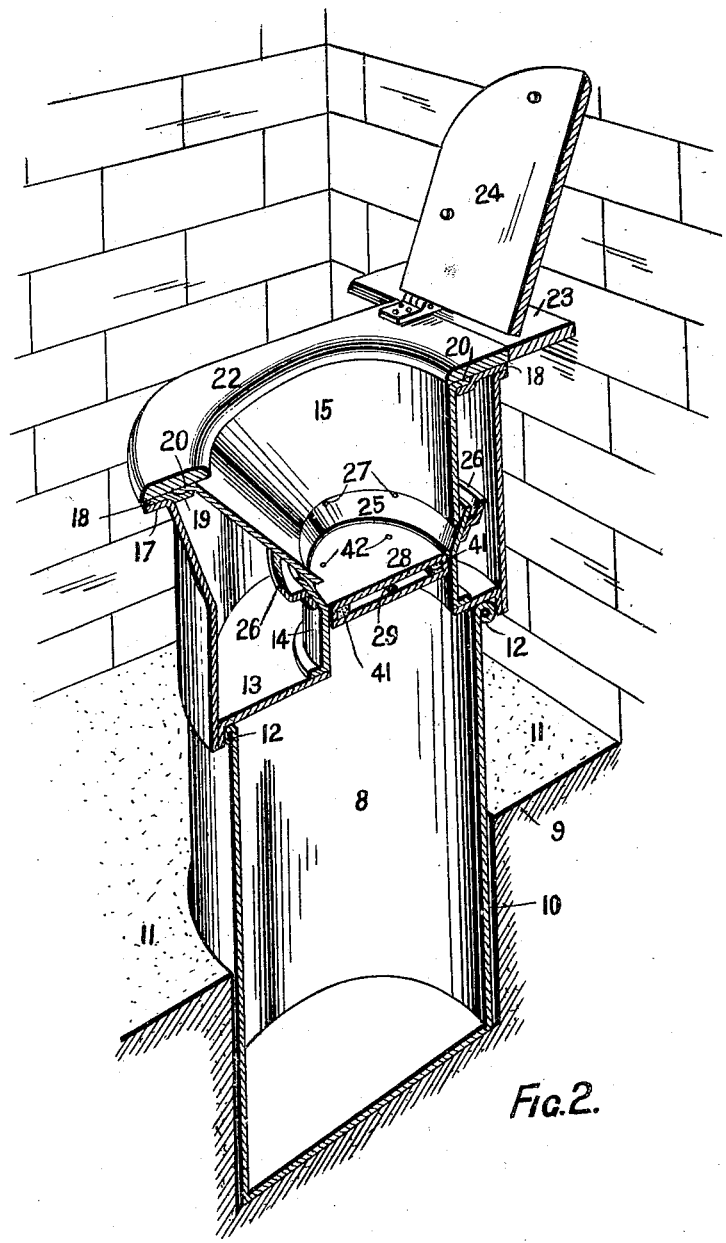
Figure 3:
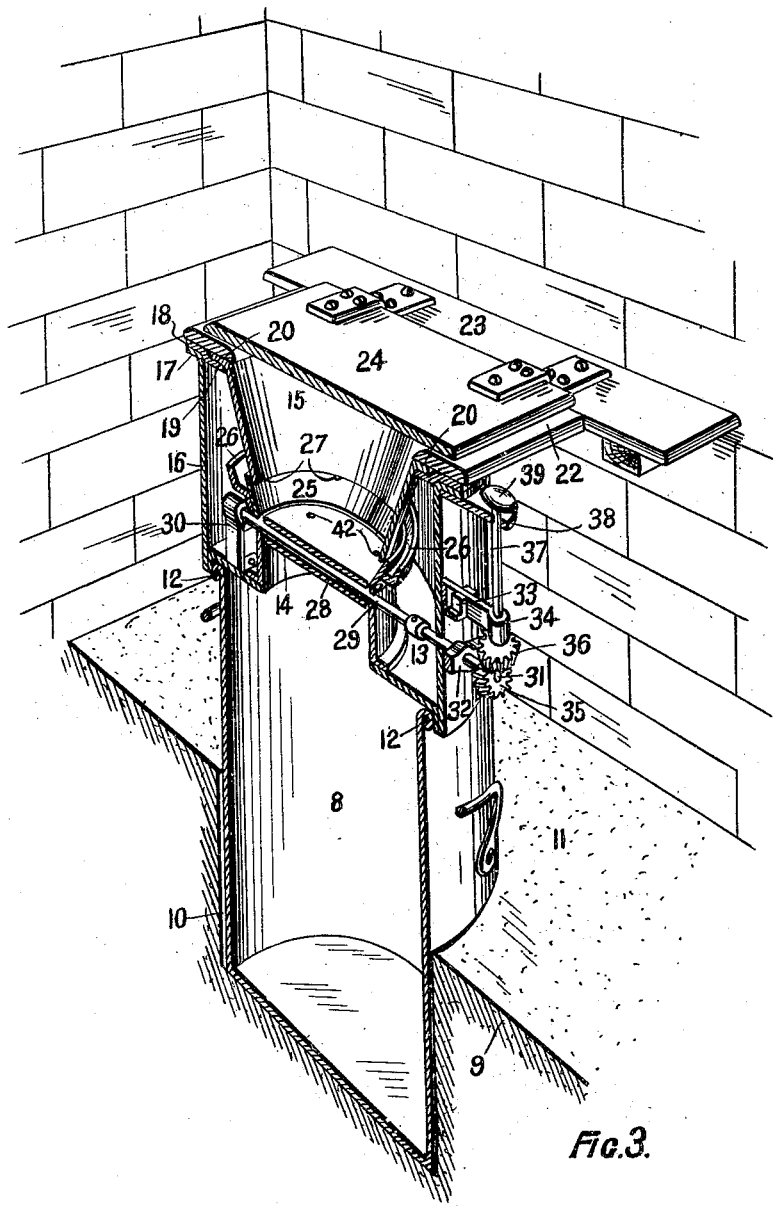

Figure 1 is a perspective view of an improved closet or privy constructed and installed according to these present improvements. Fig. 2 is a vertical central sectional perspective view on the vertical plane 2—2 of Fig. 1. Fig. 3 is a similar view on the vertical plane 3—3 of Fig. 1. Fig. 4 is a perspective view of the seat raised and the bowl lifted off the pan. Fig. 5 is a perspective view of the receiving platter or valve and Fig. 6 a similar view of the same with one face removed while Fig. 7 is a sectional perspective view on the plane 7—7 of Fig. 5.

The pan 8 of ordinary construction rests upon the floor 9 or may fit into a recess 10 therein and protrudes above the level 11 of the floor receiving tightly but removably over its rim 12 the flanged bottom 13 of the lower part or valve chamber 14 of the bowl 15 and together with this the lower edge of the supporting outer casing 16. This chamber 14 and outer casing 16 has outwardly flanged rim 17 carrying rim plate 18 extending inwardly of said casing and is recessed as at 19 for the reception of the flange or lip 20 of the bowl 15 preferably of glazed pottery-ware and upon these rests an ordinary seat 22 hinged to a wall plate 23 which also has hinged thereto seat cover 24. The valve chamber 14 has a flared mouth 25 reaching up and just overlapping the outer lower edge of the bowl 15 and it has a reservoir channel 26 for containing a fluid lubricant or disinfectant which finds its way through ducts 27 on to the inside of the mouth 25 and keeps same well lubricated and thus prevents any matter adhering thereto. Adapted to tightly close the valve chamber 14 is a valve or hollow receiving platter 28 carried on and adapted to be oscillated by horizontal spindle 29 which has bearing in bracket 30 on the bottom 13 and in the wall of the casing 16 one end of said shaft 29 has an extension 31 passing through said casing 16 and carrying outside thereof a cross arm 32 rotatable within spring jaw 33 carried by the bracket 34. Carried on the outer end of extension 31 of shaft 29 is a beveled pinion 35 gearing with similar pinion 36 on the vertical shaft 37 in bearings in said bracket 34 and in bracket 38 on the casing 16 and having an operating handle 39. The platter 28 contains a lubricant preferably a mineral oil and also a disinfectant as phenol which is supplied through the cap or plug 40 and oozes through absorbent material in the channel 41 to the ducts 42 whence it finds its way on to one or both faces of the platter 28 alternately as either is downward and so keeps said platter well lubricated to the prevention of adhesion thereto of the deposits.

In operation after the deposit of the excreta upon one lubricated face of the receiving platter 28 with or without the addition to dry earth or deodorant this is given a half revolution (checked by the spring jaw 33) by operating the handle 39 turning said platter 28 upside down so that any deposit falls into the pan 8 and the opposite clean and lubricated face of the receiving plate 28 be presented ready for next use. The platter 28 neatly fitting the passage 25 prevents ingress of flies and insects etc. to the pan 8 and prevents emission of odors from the same. The regulation of the supply of lubricating disinfectant will insure a supply of same in the pan and thereby nullify the odors of decomposition therein.

When it is desired to remove and empty or replace a pan 8 the seat cover 24 and seat 22 are swung back and the chamber 14 lifted off the storage pan 8 when a clean pan being furnished the chamber 14 is lifted thereonto when the closet will be again ready for use.

It is to be understood that the described construction of valve chamber and valve may be varied to any extent so long as its essentials namely its smooth and lubricated surface and its practically perfect closure of the connection between bowl and pan are retained.

Having now fully described and ascertained my said invention and the manner in which it is to be performed I declare that what I claim is,—

1. In closets or privies, the combination with a receiving chamber or bowl removably set upon a receptacle or pan, a valvular passage connecting same, said valvular passage having a flaring mouthed reservoir thereabout to receive a lubricant and disinfectant, and ducts extending from said reservoir into said passage.

2. In dry earth closets or privies, the combination with a pan, a bowl adapted to be positioned over said pan in air tight relation thereto, a valvular passage extending downward from said bowl, a hollow platter or valve having an interior cavity within its circumference with an absorbent filling and ducts extending from said channel to the exterior of the valve, substantially as herein set forth and shown.

In testimony whereof I have signed my name to this specification in the presence of two subscribing witnesses.

ROLAND JOHN FARMER.

Witnesses:
PERCY NEWELL,
M. J. CANDRICK.